United States Patent
Xiong

(10) Patent No.: US 7,639,063 B2
(45) Date of Patent: Dec. 29, 2009

(54) CIRCUIT FOR TURNING ON MOTHERBOARD

(75) Inventor: Jin-Liang Xiong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/960,741

(22) Filed: Dec. 20, 2007

(65) Prior Publication Data

US 2009/0153224 A1 Jun. 18, 2009

(30) Foreign Application Priority Data

Dec. 12, 2007 (CN) .................. 2007 1 0203016

(51) Int. Cl.
*H03K 17/28* (2006.01)
(52) U.S. Cl. .................. 327/398; 327/365; 327/377; 327/427; 327/544; 361/199; 365/229
(58) Field of Classification Search .......... 327/365, 327/374, 376–377, 379, 388, 398–399, 401, 327/419, 427, 432–433, 465, 470, 474, 478, 327/479, 482, 489, 544, 143; 361/199, 196; 365/229
See application file for complete search history.

(56) References Cited

U.S. PATENT DOCUMENTS

| 3,578,988 | A | * | 5/1971 | Slowikowski | ............... 327/172 |
| 5,945,868 | A | * | 8/1999 | Robb et al. | .................. 327/482 |
| 6,891,707 | B2 | * | 5/2005 | Hiyama et al. | ............. 361/93.1 |
| 2006/0280005 | A1 | * | 12/2006 | Jiang et al. | ............. 365/189.09 |

* cited by examiner

*Primary Examiner*—Long Nguyen
*Assistant Examiner*—Shikha Goyal
(74) *Attorney, Agent, or Firm*—Frank R. Niranjan

(57) ABSTRACT

An exemplary circuit for turning on a motherboard comprises a first switch module comprising a first terminal arranged to receive a standby power and connected to a sixth terminal of a computer front panel header, a second terminal arranged to receive the standby power, and a control terminal; a timing circuit charged by a system power; and a second switch module comprising a first terminal connected to the control terminal of the first switch module via the timing circuit, a second terminal arranged to receive the standby power, and a control terminal arranged to receive the system power, wherein, when the system power is lost, the second switch module discharges the timing circuit for turning on the first switch module after a discharge time, and the motherboard is turned on when the first switch module is turned on to ground the sixth terminal of the computer front panel header.

6 Claims, 1 Drawing Sheet

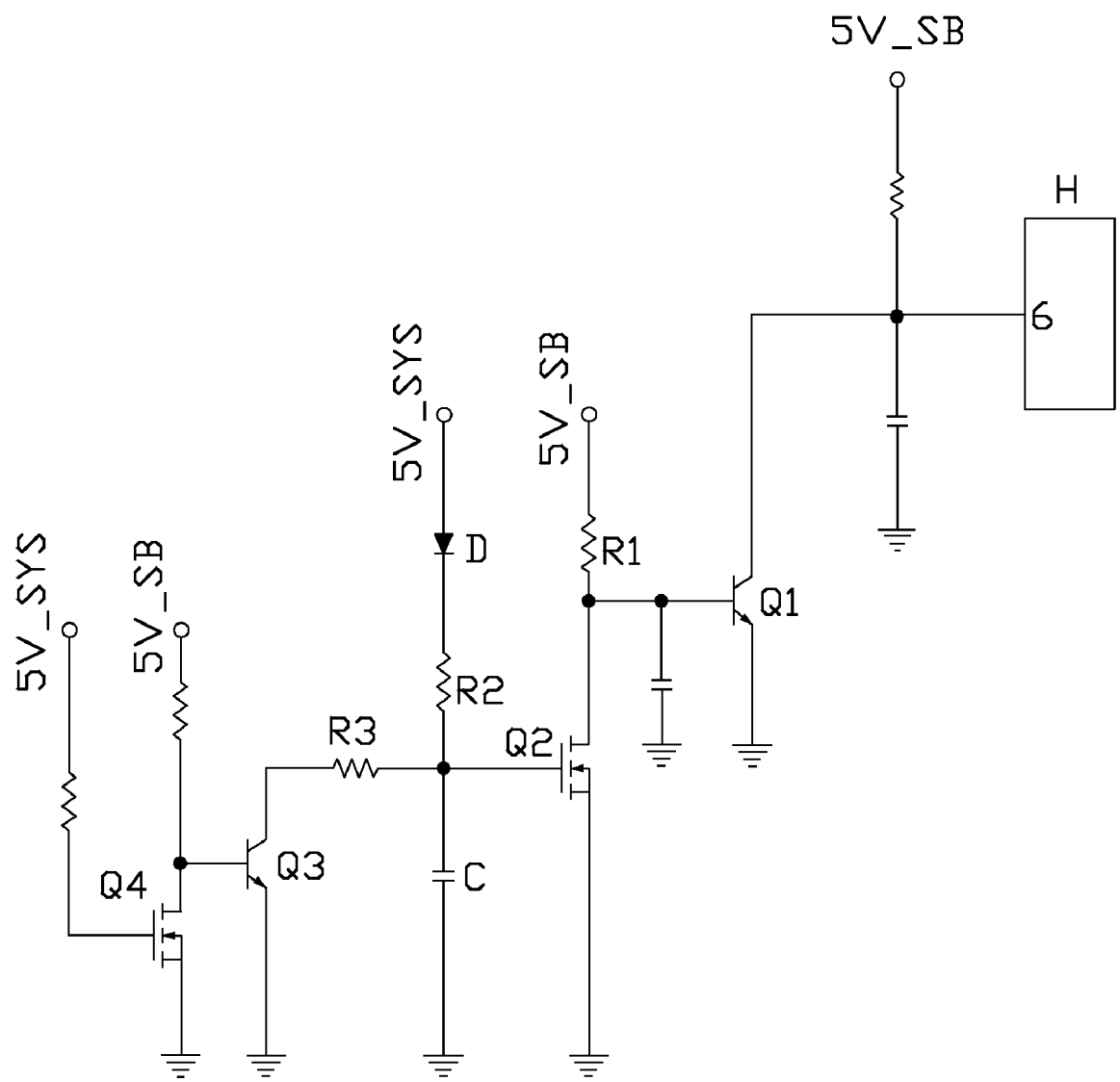

CIRCUIT FOR TURNING ON MOTHERBOARD

BACKGROUND

1. Field of the Invention

The present invention relates to a circuit for turning on a motherboard.

2. Description of Related Art

In computer systems such as personal computer (PC) systems, operators usually need to press a power bottom of the PC system to ground a sixth terminal of a computer front panel header, thereby turning on the computer system, which is inconvenient and time consuming for operators manually performing a motherboard test, in which it is common to power up the motherboard about a thousand times.

What is needed, therefore, is a circuit which can solve the above problem.

SUMMARY

An exemplary circuit for turning on a motherboard comprises a first switch module comprising a first terminal arranged to receive a standby power and connected to a sixth terminal of a computer front panel header, a second terminal arranged to receive the standby power, and a control terminal; a timing circuit charged by a system power; and a second switch module comprising a first terminal connected to the control terminal of the first switch module via the timing circuit, a second terminal arranged to receive the standby power, and a control terminal arranged to receive the system power, wherein, when the system power is lost, the second switch module discharges the timing circuit for turning on the first switch module after a discharge time, and the motherboard is turned on when the first switch module is turned on to ground the sixth terminal of the computer front panel header.

Other advantages and novel features of the present invention will become more apparent from the following detailed description of preferred embodiment when taken in conjunction with the accompanying drawing, in which:

BRIEF DESCRIPTION OF THE DRAWINGS

The drawing is a circuit diagram of a circuit for turning on a motherboard in accordance with an embodiment of the present invention.

DETAILED DESCRIPTION

Referring to the drawing, a circuit for turning on a motherboard in accordance with an embodiment of the present invention includes a first switch module comprising an NPN transistor Q1 and an NMOS transistor Q2, a timing circuit comprising two resistors R2 and R3 and a capacitor C, and a second switch module comprising an NPN transistor Q3 and an NMOS transistor Q4.

The collector of the NPN transistor Q1 is arranged to receive a standby power 5V_SB and connected to a sixth terminal 6 of a computer front panel header H. The emitter of the NPN transistor Q1 is grounded. The base of the NPN transistor Q1 is connected to the drain of the NMOS transistor Q2. The drain of the NMOS transistor Q2 is arranged to receive the standby power 5V_SB via a resistor R1. The source of the NMOS transistor Q2 is grounded. The anode of a diode is arranged to receive a system power 5V_SYS, while the cathode is grounded via the resistor R2 and the capacitor C in turn. The gate of the NMOS transistor Q2 is connected to a node between the resistor R2 and the capacitor C. The collector of the NPN transistor Q3 is connected to the node between the resistor R2 and the Capacitor C via the resistor R3. The emitter of the NPN transistor Q3 is grounded. The base of the NPN transistor Q3 is connected to the drain of the NMOS transistor Q4. The drain of the NMOS transistor Q4 is arranged to receive the standby power 5V_SB. The source of the NMOS transistor Q4 is grounded. The gate of the NMOS transistor Q4 is arranged to receive the system power 5V_SYS.

When a power of a computer system is turned on to start a motherboard test, the standby power 5V_SB is provided but the system power 5V_SYS will not be provided until the motherboard is turned on. At this time, the sixth terminal 6 of the computer front panel header H is at a high level. Then, the NMOS transistor Q2 is turned off to turn on the NPN transistor Q1, and the sixth terminal 6 of the computer front panel header H is at a low level for turning on the motherboard. Therefore, the system power 5V_SYS is provided by the power supply. The NMOS transistor Q4 is turned on for turning off the NPN transistor Q3, and the capacitor C is charged by the system power 5V_SYS. While the motherboard is turned off by a software preinstalled in the computers system, the system power 5V_SYS is lost and the standby power 5V_SB is still provided by the power supply. The NMOS transistor Q4 is turned off for turning on the NPN transistor Q3, and the capacitor C is discharged via the resistor R3 and the NPN transistor Q3 for turning off the NMOS transistor Q2 after a discharge time. Therefore, the NPN transistor Q1 is turned on and the sixth terminal 6 of the computer front panel header H is at a low level again for turning on the motherboard.

The discharge time can be selected according to the values chosen for the capacitance of the capacitor C and the resistance of the resistor R3. Therefore, the motherboard can be automatically turned on by the circuit, after the discharge time.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A circuit for automatically turning on and off a motherboard repeatedly in a motherboard test, the circuit comprising:
   a first switch module comprising a first terminal arranged to receive a standby power and connected to a sixth terminal of a computer front panel header which controls turning on and off of the motherboard, a second terminal arranged to receive the standby power, and a control terminal;
   a timing circuit charged by a system power; and
   a second switch module comprising a first terminal connected to the control terminal of the first switch module via the timing circuit, a second terminal arranged to receive the standby power, and a control terminal arranged to receive the system power, wherein, when a power of a computer system is turned on to start the motherboard test, the sixth terminal of the computer front panel header is at a high level, the first switch module is turned on to make the sixth terminal of the computer front panel header at a low level for turning on the motherboard, the second switch module is turned off, and the timing circuit is charged by the system power; when the system power is lost, the second switch module is turned on and discharges the timing circuit for turning on the first switch module after a discharge time, and the motherboard is turned on when the first switch module is turned on to ground the sixth terminal of the computer front panel header.

2. The circuit as claimed in claim 1, wherein the first switch module comprises a first NPN transistor and a first NMOS transistor, the collector of the first NPN transistor is the first terminal of the first switch module connected to the sixth terminal of the computer front panel header which controls turning on and off of the motherboard, the emitter is grounded, and the base is connected to the drain of the first NMOS transistor as the second terminal of the first switch module, the source of the NMOS transistor is grounded, and the gate of the NMOS transistor is the control terminal of the first switch module; wherein, when the power of the computer system is turned on to start the motherboard test, the first NMOS transistor is turned off to turn on the first NPN transistor, the timing circuit is charged by the system power; when the system power is lost, the second switch module is turned on and discharges the timing circuit for turning off the first NMOS transistor and turning on the first NPN transistor after a discharge time.

3. The circuit as claimed in claim 2, wherein the second switch module comprises a second NPN transistor and a second NMOS transistor, the collector of the second NPN transistor is the first terminal of the second switch module, the emitter of the second NPN transistor is grounded, the base of the second NPN transistor is connected to the drain of the second NMOS transistor as the second terminal of the second switch, the source of the second NMOS transistor is grounded, and the gate of the second NMOS transistor is the control terminal of the second switch module connected to the system power; wherein, when the power of the computer system is turned on to start the motherboard test, the first switch module is turned on, and the sixth terminal of the computer front panel header is at a low level for turning on the motherboard, the second NMOS transistor is turned on for turning off the second NPN transistor, the timing circuit is charged by the system power, when the system power is lost, the second NMOS transistor is turned off for turning on the second NPN transistor and discharges the timing circuit via the second NPN transistor for turning on the first switch module after a discharge time, and the motherboard is turned on when the first switch module is turned on to ground the sixth terminal of the computer front panel header.

4. The circuit as claimed in claim 3, wherein the timing circuit comprises a diode, a first resistor, a second resistor, and a capacitor, the anode of the diode is arranged to receive the system power, the cathode is grounded via the first resistor and the capacitor in turn, the second resistor is connected between the first terminal of the second switch module and a node between the first resistor and the capacitor, and the control terminal of the first switch module is connected to the node.

5. The circuit as claimed in claim 4, wherein the discharge time is selected by selection of corresponding values of capacitance of the capacitor and resistance of the second resistor.

6. A circuit for automatically turning on and off a motherboard repeatedly in a motherboard test, the circuit comprising:
a first switch module comprising a first transistor and a second transistor, a collector of the first transistor connected to a standby power and a sixth terminal of a computer front panel header which controls turning on and off of the motherboard, an emitter of the first transistor being grounded, a drain of the second transistor arranged to receive the standby power and connected to the base of the first transistor, a source of the second transistor being grounded;
a second switch module comprising a third transistor and a fourth transistor, a collector of the third transistor connected to the gate of the second transistor, an emitter of the third transistor being grounded, a base of the third transistor connected to a drain of the fourth transistor and arranged to receive a standby power, a source of the fourth transistor being grounded, and a gate of the fourth transistor arranged to receive the system power; and
a timing circuit comprising a diode and a capacitor, the anode of the diode connected to the system power, the cathode being grounded via a resistor and the capacitor in turn, and connected to the gate of the second transistor, so that the capacitor is capable of being charged by the system power under the control of turn-off of the third transistor, and discharged through the collector and the emitter of the third transistor to ground under the control of turn-on of the third transistor.

* * * * *